April 18, 1961  J. F. HALE ET AL  2,980,543
PROCESS FOR PREPARING INSTANT POTATO
Filed July 16, 1958

INVENTORS
JAMES F. HALE
RALPH A. KLEIN
ELIZABETH M. BRADWAY

BY
ROBERT CALVERT
ATTORNEY

United States Patent Office

2,980,543
PROCESS FOR PREPARING INSTANT POTATO

James F. Hale, Syracuse, Ralph A. Klein, Liverpool, and Elizabeth M. Bradway, Syracuse, N.Y., assignors to The Borden Company, New York, N.Y., a corporation of New Jersey Filed July 16, 1958, Ser. No. 748,873

9 Claims. (Cl. 99—207)

This invention relates to cooked, dehydrated potato reconstitutable to give mashed potato that is non-sticky and of good texture.

Cooked, dehydrated potatoes have been made heretofore by forming in effect a mashed potato and incorporating into the wet mash various conventional components such as an antioxidant, preservative, and parting agent to improve separation of the material from rolls or the like during processing. The mash is then dried as in a thin layer on steam-heated rollers. The dried sheets so formed are broken into flakes and the product packaged for shipment.

While the product so made has merit, it has certain disadvantages that restrict consumer acceptance. Among these disadvantages are the formation of a gummy mass during reconstitution if stirred too vigorously with an electric mixer, sensitiveness of the mass upon reconstitution to small variations in the proportion of reconstituting liquid, doughiness or stickiness of the product that causes adherence of it to the beater and to the utensil in which the dried product is stirred during reconstitution, gradual stiffening up and development of a shiny appearance of the surface of the reconstituted product, or lack of the texture of the usual home mashed potato.

Our invention provides a process and product which eliminates these disadvantages or reduces them to such extent as greatly to increase acceptability of the product.

Briefly stated, our invention comprises the herein described process and product of applying, to the potato, after cooking and drying, a texture improving and antisticking agent, sometimes hereinafter referred to as the "improver."

In general, our process is as follows. Cooked and disintegrated potato containing approximately its natural proportion of water and, if desired, the said conventional components is applied as a thin layer to a drying roller or drying rollers and there dried. The resulting dried thin sheet is then cut or broken into particles, thin flakes being illustrative. In a subsequent step, the improver is introduced. In the commercial embodiment, the improver is usually glycerine monopalmitate (GMP), conveniently mixed with a hydrogenated vegetable fat, and it is sprayed upon the dried flakes.

The product so sprayed is then reconstitutable to mashed potato, as at about 160° F. in a water and milk mix. The reconstituted material, when dropped on a plate, undergoes spreading and shattering to about the extent that is normal for home mashed potatoes. A representative product showed 35 seconds required for penetration of a plunger in our standard consistency test. A product made comparably but with no addition of the improved subsequent to drying the potato was thinner, more sticky, required only 8 seconds for penetration of the plunger, and did not shatter but simply spread when dropped on the plate.

It is considered that the results are due in part at least to partial isolation of starch coming from ruptured cells resulting from processing and reconstituting. This isolation, in turn, may be explained by the orientation of the hydrophilic and hydrophobic groups of the GMP with the hydrophilic "head" in the potato and the hydrophobic "tail" of the molecule extending outwardly from the surface of the previously dried potato, so as to decrease the accessibility of the cells to water. Such orientation would decrease the accessibility to water which otherwise would cause pasting of the potato. Also the texture improving and antisticking agent may be considered to decrease the accessibility of the cells by incipient gelling with water in contact with the surface of the potato, on which interface the said agent should be somewhat concentrated.

If, on the other hand, the addition of the "improver" is made to the disintegrated potato before it is dried and the mixture then dried, the reconstituted potato resembles the product made without the addition.

The invention will be illustrated by description in connection with the attached drawing to which reference is made.

Figure 1:
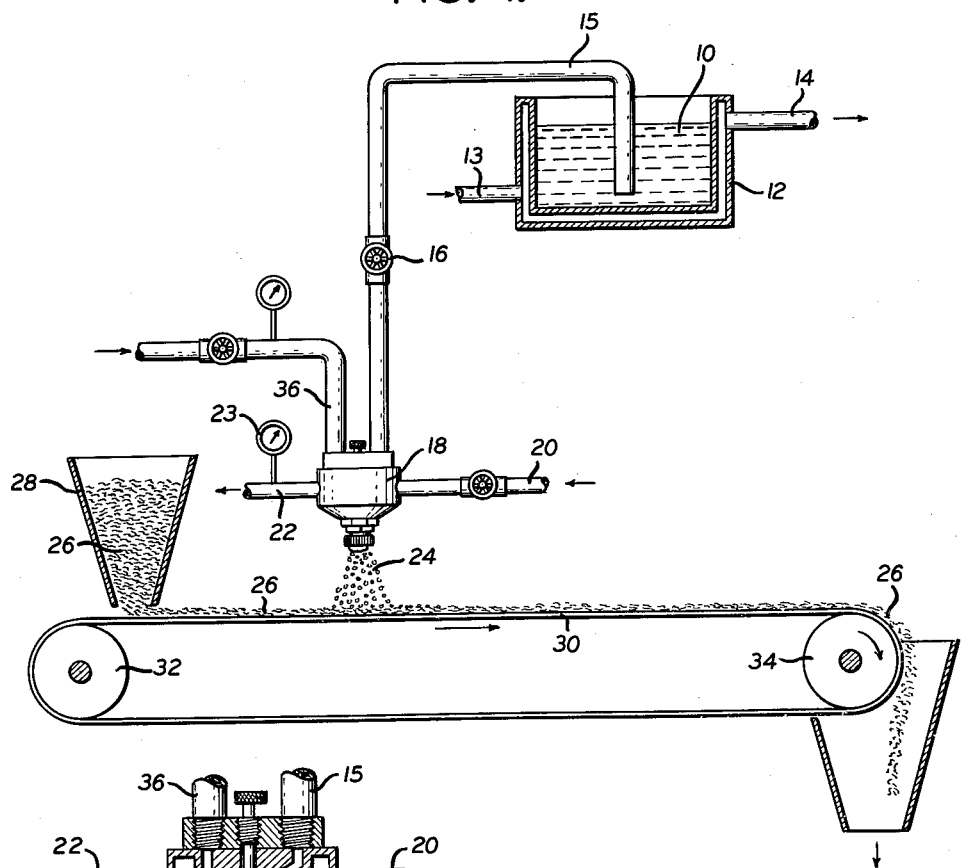
Fig. 1 shows an elevation of suitable equipment for applying the texture improving and antisticking agent to the dried flakes or other dried particles of potato.

The figures are in part diagrammatic. Equipment not shown in detail is conventional.

The mixture 10 of the texture improving and antisticking agent (usually a mixture of the said agent and a fat) is kept in melted condition in the steam jacketed container 12 with steam inlet 13 and outlet 14, the steam used being ordinarily at about atmospheric pressure.

The line 15 siphons the melted mixture to the adjustable metering valve 16 and then to the spray nozzle 18. This nozzle is provided with a steam jacket 19 with entrance 20 for the steam and exhaust 22 with gauge 23, the sprayed particles of the improver and fat spreading as shown at 24 and falling upon the dried potato flakes 26 delivered through hopper 28 to the upper reach of the conveyor belt 30 passing over the rollers 32 and 34. The flakes with the applied mixture of agent and fat then fall to a collector (not shown).

Figure 2:
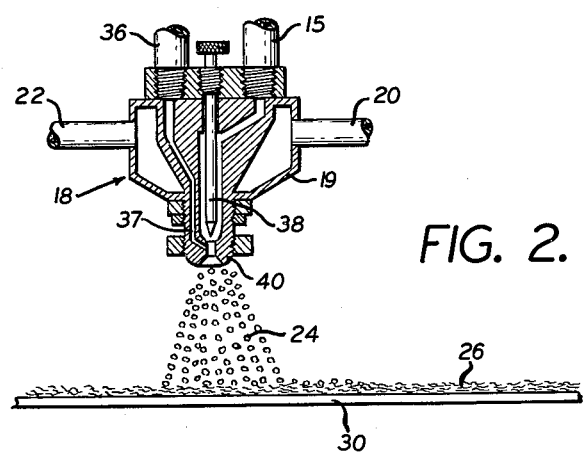
Fig. 2 is an enlarged view, partly in section, of the spray nozzle applying the improver to the flakes.

The spray nozzle shown in some detail in Fig. 2 is type 1/4 JBCJ of Spraying Systems Company. In addition to the inlet and outlet for the steam, which maintains the liquid 10 in heated condition, and for the said liquid itself, there is the inlet 36 for air, air duct 37 to the nozzle 40, and the control valve 38.

While this equipment is designed for use with relatively high air pressures such as 10–60 p.s.i., we reduce the air pressure to a wholly abnormal level such as about 0.2–0.5 p.s.i. and up to 2 p.s.i. By the use of such low air pressure, we avoid formation of a fine mist or fog of the sprayed material, avoid excessive cooling by the dispersing air, and cause the liquid 10 to fall in the form of droplets of substantial size upon the potato flakes without the droplets freezing in the passage from the nozzle to the flakes.

The fat serves, among other things, as a solvent for the texture improving agent and lowers the melting point thereof.

In a representative operation, the spray nozzle is adjusted to deliver 25–30 grams of the mixture of texture improving and antisticking agent and fat per minute. The nozzle is mounted with the delivery orifice 6 inches above the conveyor belt, the belt is 8 inches wide, and its speed to the right in the figures is about 1 foot per second. Approximately 5 pounds of the dried potato flakes in a layer about 1–3 flakes thick pass under the spray per minute. The molten liquid 10, sprayed at the stated low air pressure, strikes the flakes while it is still in liquid condition. It then solidifies in 2 to 3 seconds on the average and is ready for packaging when delivered from the conveyor, at the right side of Fig. 1, after 5–6 seconds.

At the start of the operation the air pressure used is approximately 10 p.s.i. with the control valve 16 completely open, to start the siphon effect. Then the air pressure is caused to drop by adjustment of the valves, to a level at which the liquid is broken up in the spray nozzle into coarse droplets but without causing any appreciable extraneous fog and without freezing the droplets before they strike the potato flakes.

When water strikes the treated flakes, in the reconstituting operation, the water becomes quickly associated with the said agent before time elapses for objectionable action of water with the potato at the temperature of about 160°–170° F.

Various kinds of potatoes may be selected. We use to advantage those of medium to high solids content, as, for instance, those from Maine. New potatoes or those that are particularly high in water content are not recommended by us although benefited by our process.

As the texture improving and antisticking agent, we use a water-dispersible surfactant that is non-toxic and edible, has both hydrophobic and hydrophilic groups, and is resistant to oxidation to the extent of preventing development of rancidity of the agent as used on the dried potato. Examples that meet the general requirements stated and illustrate the class of materials to be used are the following: Glycerine monopalmitate, monolaurate, and monostearate and corresponding monoglycerides of other saturated $C_{12}$–$C_{20}$ monocarboxylic aliphatic acids, suitably in the condition of having been molecularly distilled and of content of monoglyceride, as distinguished from diglyceride, in the product of at least 60% and better 80%–100% of the glycerine esters present; like partial esters such as mono- and diesters of the said acids with glycerine and other polyhydric alcohols that contain not more than 6 carbon atoms to the molecule, examples being propylene glycol and sorbitol; MYRJ, a low melting polyoxyethylene derivative of a fat-forming higher fatty acid such as stearic acid, with 8 units of ethylene oxide to 1 of the acid, corresponding derivatives of other of said $C_{12}$–$C_{18}$ acids such as lauric and palmitic, and Tween 65, polyoxyethylene sorbitan tristearate containing 3–20 units of ethylene oxide to the molecule, these materials requiring no admixed fat as supplied to the spray nozzle; lecithin of good grade although less satisfactory in texture improvement than the glycerine monoesters; partial esters, particularly the mono-, di-, and triesters, of any $C_4$–$C_{12}$ sugar such as sorbose, dextrose, levulose, sucrose, lactose, and maltose, maltose with a $C_{12}$–$C_{20}$ saturated monocarboxylic fatty acid, all subject to approval for food use.

Parting materials that may be incorporated in the wet potato mash may be any usual material that prevents sticking of wet starchy compositions to heated rolls. They may be the texture improving and antisticking agents described above. When used, however, in the mash before drying, these agents are not effective in giving our non-sticky, properly mealy reconstituted product.

Fats to be incorporated with the texture improving and antisticking agent, in those cases in which the introduction of a fat is necessary to lower the melting point to working temperature, are non-oxidizing. Hydrogenated fats are particularly satisfactory. They avoid development of rancidity in the product on contact with air. Ordinarily we use a hydrogenated vegetable oil as, for instance, hydrogenated soyabean, corn, or cottonseed oil, an example being Primex B & C. Other fatty materials that may be used are the triglyceride of any $C_{12}$–$C_{20}$ monocarboxylic fatty acid and, for best results, a $C_{12}$–$C_{18}$ acid.

The antioxidant used may be any antioxidant commonly used in food products for prevention of rancidity or oxidation of fats. Examples of such antioxidants are butylated hydroxyanisole, butylated hydroxytoluene, and propyl gallate and critic acid as synergistic material. These materials may be introduced separately but are suitably used in admixture with each other, as in the product Tenox 6.

Approved preservatives such as sodium sulfite and sodium bisulfite alone or mixed may be and suitably are incorporated into the wet mash before drying.

As solvent for the texture improving and antisticking agent, there may be used, in place of part or all of the fat, a polyhydroxy compound of which propylene glycol is an example. Also glycerine may be used, as in a mixture with the said glycol.

The proportion of the texture improving and antisticking agent used varies somewhat with the kind of potatoes processed and the particular degree of mealiness or anti-stickiness required in the finished product. Permissible proportions of the agent are 0.1–1.5 parts and for best results about 0.2–1 part for 100 parts dry weight of potato. When the proportion is less than the minimum amount stated, the effect in eliminating stickness or increasing the mealiness of the reconstituted product is not adequate for most purposes. When the proportion is much above 1%, then the taste is occasionally affected. The exact proportion varies with the particular agents selected, the conditions of reconstituting, and particularly the variety of potatoes used. We require less of the texture improving agent, within the ranges stated, for potatoes such as Idaho Russet Burbank that are relatively high in solids content.

When the solvent such as one of the fats stated or the mixture of the fat with propylene glycol is used, it is in the proportion of about 10–100 parts for 100 parts of the texture improving and antisticking agent. Propylene glycol may be used in the proportion of about 10–40 parts for 100 of the fat or alone in the amount of about 5–30 parts for 100 of the said agent.

The parting material, preservative, antioxidants, and the seasoning materials, if any, may be incorporated into the wet mash, before drying, in kind and in amount which is conventional in this type of product, a preservative such as sodium sulfite or bisulfite or mixture thereof being used ordinarily in amount less than 0.1 part for 100 of the dried potato.

The reconstituting liquid, such as water or a mixture of water and milk, in the proportions of about 2–3 parts of the former to 1 of the latter, is used ordinarily in the amount of approximately 4.5–6 parts of the liquid to 1 of the dried potato material.

The test for consistency of the reconstituted product is made by dropping a standard plunger vertically from a 1 inch height onto a mass of the said product. For this test the plunger is the usual type of 15 ml. glass centrifuge tube having a tapered lower portion, terminating in a rounded narrow end which is downward in the test. The tube is weighted with mercury, to give a total weight of 57 grams, and closed. The time is noted for the plunger, under its own weight, to sink in the mass of reconstituted potato to the 6 ml. mark just above the level at which the tube becomes full width.

While the numerical values in the plunger penetration test vary from batch to batch because of variations in kind of potatoes used and other factors, we have found in all cases a slowing down in the rate of penetration of the plunger, showing increased mealiness or resistance to flow for a given proportion of reconstituting liquid used, when the improver is added to the cooked potato after the original mash has been dried. The same agent added to the mash before drying does not give the result.

In the following examples and elsewhere herein, proportions are expressed as parts by weight.

*Example 1*

Maine Katahdin potatoes of water content 17.5%–20% are peeled as by pressure steam at 115 p.s.i., deeyed, washed, sliced, and cooked in water or in steam or both, all in conventional manner. Steam cooking, if used, is ordinarily with atmospheric pressure steam for 17 minutes. The potato slices so cooked are then disintegrated by passage through 0.4 inch holes such as those of an ordinary type of meat grinder from which the cutting knives are removed. The resulting potato mash is then mixed with 0.075% of Tenox 6 antioxidant and 0.1% of GMP parting agent on the dry weight of potato and with sodium sulfite (3 parts) and bisulfite (1 part) in amount to provide 0.02% of $SO_2$ in the final dried product. The whole is then applied as a layer about 0.005–0.01 inch thick over the exterior of a steam-heated drying roller. As the roller is rotated to the position at which the sheet has been dried, the dried sheet is removed by scrapers. At this stage it contains about 3.5%–4% of water although proportions of water as high as 7% or so are considered permissible but not desirable. The dried sheet is then passed through breakers or cutters which form it into small flakes about a half inch square, resembling somewhat ordinary soap flakes.

The dried potato flakes are treated with the texture improving and antisticking agent, as by being sprayed therewith at the rate of 0.55% of the glycerine monopalmitate (Myverol 16–00) dissolved in an equal weight of hydrogenated cottonseed oil, this rate of addition corresponding to a total weight of GMP and fat of about 1.1%–1.3% on the dry weight of the potato flakes.

The product, when reconstituted by being stirred at the rate of 1 part of the treated flakes to 5.5 parts of a mixture of .5 of boiling water to 0.5 of milk, was ready to serve after less than 1 minute's stirring into the heated liquid at 160°–170° F. The reconstituted material was mixed with a small proportion of butter and salt for seasoning. The product was not sticky in the vessel in which the reconstitution was effected or during eating. It had the desired mealy consistency and closely resembled the consistency, taste, and acceptability of home prepared mashed potatoes.

In a modification of this invention, the combination of the cooking in water followed by the steam cooking is replaced by either the water cooking alone or the steam cooking alone, the time being adjusted to give a well-cooked disintegratable product at the time of the breaking down of the original structure.

Example 2

The procedure and composition of Example 1 are used except as noted below.

The potatoes used where Idaho Russet Burbank and the liquid 10 sprayed on corresponded to a total of 0.8% of the weight of the dried flakes, the GMP being used in a mixture with equal parts by weight of hydrogenated cottonseed oil. When reconstituted the product was desirably short, dry, and fluffy, with a sinking time of 12 seconds in the standard plunger test.

In a modification of this example, the potatoes were made into granules of the cooked material. About 0.5% of the said mixture of texture preserving agent and fat was sprayed upon the dried granular material. The reconstituted product was short, dry, and fluffy and the sinking time of the plunger in the standard test was 3 seconds as against a sinking time of approximately 0 seconds when none of the liquid had been sprayed upon the granules.

Example 3

In a modification of Example 1, the Tenox anti-oxidant (mixed butylated hydroxyanisole and hydroxytoluene, propyl gallate, and citric acid in propylene glycol solution) was mixed in the proportion of approximately 0.35 part of the Tenox for 100 parts of the mixed fat and texture improving and antisticking agent and the resulting three-component mixture was applied by means of the pneumatic spray nozzle as described. The procedure otherwise was as described.

Example 4

The procedure and composition of Example 1 are used except that the glycerine monopalmitate there used was replaced by lecithin in the proportion of 0.87% of the dry weight of the potato. The product obtained after reconstitution is satisfactory in the desired non-stickiness but not as short or mealy as products made with the glycerine monoesters.

Example 5

The procedure and composition of Example 1 are used except that the glycerine monpalmitate there used was replaced by sucrose dipalmitate in the proportion of 0.8% of the dry weight of the potato. The product after reconstitution was satisfactory.

In a modification of this example, the sucrose dipalmitate is replaced by an equal weight of mono-, di-, or tripalmitate of any $C_4$–$C_{12}$ sugar such as any one of those disclosed herein.

Example 6

Dried flakes of the cooked and then disintegrated potatoes are made by the conventional process. The flakes are then reconstituted as described in the mixture of water and milk (1 part to 3 of water) at about 165° F. Into the reconstituted mashed potato so made is then introduced and stirred 0.4% of the improver, i.e. the texture improving and antisticking agent, along with 0.4% of hydrogenated cottonseed oil. In this example, the agent was glycerine monopalmitate. The product was acceptable from the standpoint of non-stickiness and mealiness.

It is essential that the improver be introduced subsequent to the time of drying the potato after the original disintegration. This avoids binding of the improver within particles of dried material or reaction of the improver with the potato in the hot wet mash or during the succeeding drying step.

Example 7

The procedure and composition of any one of Examples 1–5 are used exactly as described with the exception of the following substitutions:

Any of the texture improving and antisticking agents disclosed herein or mixtures of them are substituted on an equal weight basis for the agent used for the same purpose.

Any of the fats disclosed or mixtures of fat with propylene glycol is substituted on an equal weight basis for the fat used.

The texture improving and antisticking agent is replaced by an equal weight of MYRJ 45 or Tween 65 and the fat used with the replaced improver is omitted.

Any of the preservatives and parting materials disclosed herein are introduced in conventional amounts in the wet disintegrated potato before it is dried, and any one of the antioxidants is supplied either before or after the drying step.

The temperature of reconstitution is higher than the range stated, as up to the boiling point of water. At the higher temperature, there is some gelatinization and development of stickiness, but to a smaller extent than when no improver is present.

The improver is introduced in solid form, as by being dusted into the dried flakes.

It is to be understood that it is intended to cover all changes and modifications of the examples of the invention herein chosen for the purpose of illustration which do not constitute departures from the spirit and scope of the invention.

We claim:

1. In preparing, from cooked and mashed potatoes, a dry product reconstitutable to mashed form by mixing with a hot water and milk, the improvement which comprises drying the mashed potato, then reducing it to particulate form and applying to the surfaces of the particles so formed a texture improving and antisticking agent, the said agent being a non-toxic, edible and oxidation resistant surfactant containing both hydrophilic and hydrophobic groups and the proportion of the said agent so applied being about 0.2–1.5 parts for 100 parts dry weight of the potato.

2. The process of claim 1, the said agent being selected from the group consisting of mono- and diesters of $C_{12}$–$C_{20}$ monocarboxylic saturated fatty acids with glycerine and other non-toxic polyhydric alcohols having not more than 6 carbon atoms to the molecule, polyoxyethylene derivatives of $C_{12}$–$C_{20}$ monocarboxylic saturated fatty acids, lecithin, and mono-, di-, and triesters of a $C_4$–$C_{12}$ sugar with a $C_{12}$–$C_{20}$ saturated monocarboxylic fatty acid.

3. The process of claim 1, the said agent being a partial ester of a $C_4$–$C_{12}$ sugar with a $C_{12}$–$C_{20}$ saturated monocarboxylic fatty acid.

4. The process of claim 1, the said agent being glycerine monostearate.

5. The process of claim 1, the said agent being glycerine monopalmitate.

6. The process of claim 1, the said agent being applied to the dried potato particles in the form of a molten mixture of the said agent and a non-toxic solvent therefor selected from the group consisting of propylene glycol, glyceride fats that are stable in air, and glycerine.

7. The process of claim 1 which includes effecting the drying of the mashed potato in film form, breaking the film into flakes, and applying the texture improving and antisticking agent by spraying the agent in liquid form as droplets upon the said flakes.

8. The process of claim 1 which includes admixing the texture improving and antisticking agent in the amount of about 0.1 part for 100 parts dry weight of the potato into the cooked and mashed potato before the drying thereof, the said amount being in addition to the said proportion of the agent applied to the dried particles.

9. The process of claim 1, the said agent being polyoxyethylene sorbitan tristearate having 3–20 ethylene oxide units to the molecule.

References Cited in the file of this patent

"Potato Flakes A New Form of Dehydrated Mashed Potatoes—Pilot-Plant Process Using Double Drum Drier," U.S.D.A., Agricultural Research Service, ARS–73–2, November 15, 1954, 6 pp. text 4 pp. (not numbered) figures, pp. 1 to 5 of text relied on.

UNITED STATES PATENT OFFICE
CERTIFICATE OF CORRECTION

Patent No. 2,980,543                          April 18, 1961

James F. Hale et al.

It is hereby certified that error appears in the above numbered patent requiring correction and that the said Letters Patent should read as corrected below.

Column 5, line 32, for ".5 of boiling water" read -- 1.5 of boiling water --; line 36, after "seasoning" insert a period; column 6, line 7, for "0.87%" read -- 0.8% --.

Signed and sealed this 3rd day of October 1961.

(SEAL)
Attest:

ERNEST W. SWIDER                        DAVID L. LADD
Attesting Officer                          Commissioner of Patents